US012731212B2

(12) United States Patent
Bao et al.

(10) Patent No.: US 12,731,212 B2
(45) Date of Patent: Sep. 8, 2026

(54) METHOD FOR TRAINING SUPER-RESOLUTION MODEL, SUPER-RESOLUTION METHOD, AND SYSTEM

(71) Applicant: REALTEK SEMICONDUCTOR CORP., Hsinchu (TW)

(72) Inventors: Yi-Ting Bao, Hsinchu (TW); Chia-Wei Yu, Hsinchu (TW); Hao-Ran Wang, Changsha City (CN); Tien-Hung Lin, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 512 days.

(21) Appl. No.: 18/220,858

(22) Filed: Jul. 12, 2023

(65) Prior Publication Data

US 2024/0020791 A1 Jan. 18, 2024

(30) Foreign Application Priority Data

Jul. 13, 2022 (CN) ........................ 202210825565.8

(51) Int. Cl.
*G06T 3/40* (2024.01)
*G06T 1/60* (2006.01)
(Continued)

(52) U.S. Cl.
CPC .............. *G06T 3/4053* (2013.01); *G06T 1/60* (2013.01); *G06T 3/4046* (2013.01); *G06T 5/20* (2013.01);
(Continued)

(58) Field of Classification Search
CPC ....... G06T 3/4053; G06T 1/60; G06T 3/4046; G06T 5/20; G06T 5/50; G06T 5/77;
(Continued)

(56) References Cited

U.S. PATENT DOCUMENTS

2009/0129703 A1* 5/2009 Takeshima ............. H04N 19/59 382/299
2011/0142330 A1* 6/2011 Min ...................... G06T 3/4046 382/159

(Continued)

FOREIGN PATENT DOCUMENTS

CN 114092337 A * 2/2022 ........... G06T 3/4076

OTHER PUBLICATIONS

Bee Lim, Sanghyun Son, Heewon Kim, Seungjun Nah, Kyoung Mu Lee, "Enhanced Deep Residual Networks for Single Image Super-Resolution", arXiv:1707.02921v1 [cs.CV], Jul. 10, 2017.

(Continued)

*Primary Examiner* — Oneal R Mistry
*Assistant Examiner* — Jongbong Nah
(74) *Attorney, Agent, or Firm* — Li & Cai Intellectual Property (USA) Office

(57) ABSTRACT

A method for training a super-resolution model, a super-resolution method, and a system are provided, and the super-resolution method and the system are implemented through an AI super-resolution model that is trained by the method. In the method, an input image is provided, and a magnification ratio and an image quality threshold are set. Pixel values of the input image are retrieved, and image features of the input image are extracted. Multiple channel images are obtained through a super-resolution model based on the image features and the magnification ratio. Phase information can be obtained according to the magnification ratio and positions of output pixels, and the phase information is used to obtain masks mapping to the channel images. Therefore, an output image can be reshuffled. After a comparison with the image quality threshold, model parameters of the output image can be assessed for training the AI super-resolution model.

15 Claims, 6 Drawing Sheets

(51) Int. Cl.
*G06T 3/4046* (2024.01)
*G06T 3/4053* (2024.01)
*G06T 5/00* (2024.01)
*G06T 5/20* (2006.01)
*G06T 5/50* (2006.01)
*G06T 5/77* (2024.01)

(52) U.S. Cl.
CPC .................. *G06T 5/50* (2013.01); *G06T 5/77* (2024.01); *G06T 2207/20081* (2013.01); *G06T 2207/20084* (2013.01)

(58) Field of Classification Search
CPC . G06T 2207/20081; G06T 2207/20084; G06T 3/4076; G06N 3/02; G06N 3/045; G06N 3/08
See application file for complete search history.

(56) References Cited

U.S. PATENT DOCUMENTS

| | | | | |
|---|---|---|---|---|
| 2015/0062378 | A1* | 3/2015 | Watanabe | H04N 23/76 348/231.99 |
| 2017/0186140 | A1* | 6/2017 | Eguchi | G06T 5/73 |
| 2020/0334789 | A1* | 10/2020 | Zhang | H04N 23/69 |

OTHER PUBLICATIONS

Kuecai Hu,Haoyuan Mu,Xiangyu Zhang,Zilei Wang,Tieniu Tan,Jian Sun, “Meta-SR: A Magnification-Arbitrary Network for Super-Resolution”, Computer Vision Foundation, pp. 1575-1584.

Longguang Wang,Yingqian Wang,Zaiping Lin,Jungang Yang,Wei An,Yulan Guo, “Learning A Single Network for Scale-Arbitrary Super-Resolution”, Computer Vision Foundation, pp. 4801-4810.

* cited by examiner

METHOD FOR TRAINING SUPER-RESOLUTION MODEL, SUPER-RESOLUTION METHOD, AND SYSTEM

CROSS-REFERENCE TO RELATED PATENT APPLICATION

This application claims the benefit of priority to China Patent Application No. 202210825565.8, filed on Jul. 13, 2022 in People's Republic of China. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a technology for rendering a large size image through a super-resolution algorithm, and more particularly to a method for training a non-integer ratio super-resolution model through a mask and a neural network technology, a super-resolution method, and a system for implementing the same.

BACKGROUND OF THE DISCLOSURE

A conventional super resolution technology is provided for increasing image resolution through algorithms. The super resolution technology usually cooperates with an artificial intelligence (AI) technology to increase the image resolution with a machine-learning algorithm, which is also referred to as an artificial intelligence super resolution (AISR) algorithm. The technological concept is to use a large number of sample photos to train a convolution neural network (CNN) based super-resolution machine-learning model that can be used to match a low-resolution image to a high-resolution image. For example, the CNN-based super-resolution machine-learning model can upscale a 10-megapixel image to a 40-megapixel image, and can still preserve rich details of the image. A conventional super-resolution algorithm operates in a manner as shown in a concept diagram of FIG. 1. An input image 101 is a low-resolution image, and after being processed by a super-resolution machine-learning model 103, an output image 105 (a high-resolution image) can be rendered.

The AISR algorithm and a hardware design thereof are mainly configured for implementing an integer-multiple magnification (e.g., 1×, 2×, 3×, . . . ). How the algorithm can be used to achieve any magnification has been mentioned in other technologies.

With regard to an integer-ratio artificial intelligence super-resolution algorithm, there are papers written on implementation of an enhanced deep residual network for single image super resolution, and a model framework mentioned therein can improve performance of the enhanced deep residual network for single image super resolution (EDSR).

With regard to a method for performing a super-resolution algorithm with any magnification, a conventional magnification-arbitrary network for super resolution has been provided to implement the magnification-arbitrary super-resolution algorithm through a single model. By inputting scaling factors and using dynamically-predicted weights of upscale filters, a low-resolution image can be magnified to a high-resolution image of any size.

In a conventional neural-network-based hardware, a pipeline mechanism is used to process input/output data. In a practical application, when a ratio of the output and input data is not an integer, this can cause restrictions that do not allow a direct use of the artificial intelligence super resolution for enhancement of an image quality. Hence, a scaler needs to be added in a second half of a process for performing the algorithm, so as to compensate the insufficient magnification ratio by way of interpolation.

FIG. 2 is a schematic diagram showing the hardware that embodies the super-resolution algorithm. In addition to a super-resolution model (SR Model), a super-resolution machine-learning model 203 also includes an image upscaling converter. For an integer ratio magnification, reference can be made to FIG. 3, which is a timing diagram that shows operation of the super-resolution algorithm by the hardware. When a size of an input image 201 that applies the super-resolution algorithm is 10*10 pixels and the scaling factor is "2×", the image magnification function of the super-resolution machine-learning model 203 converts the input image 201 into $2^2$(4) input small images (e.g., an odd-line-odd-pixel graph 211, an odd-line-even-pixel graph 212, an even-line-odd-pixel graph 213 and an even-line-even-pixel graph 214). Then, these 4 input small images are reshuffled into one large image. The large image is an output image 205 of 20*20 pixels as shown in the diagram. That is to say, referring to the timing diagram of FIG. 3, two output image signals 305 of 20 pixels are outputted through the super-resolution machine-learning model 203 when one input image signal 301 of 10 pixels is inputted at the same time.

Further, for a non-integer ratio magnification super-resolution algorithm, two operational stages are adopted in the algorithm since the conventional artificial intelligence super-resolution algorithm cannot achieve the non-integer ratio magnification. FIG. 4 is a schematic diagram illustrating an example of performing the non-integer ratio super-resolution algorithm. In this exemplary example, an input image 401 with a size of 10*10 pixels is provided, and the scaling factor is "1.5×". Through a super-resolution machine-learning model 403, a first stage of the super-resolution algorithm is performed, such that a first output image 405 is outputted. Then, the first output image 405 is processed by an image-scaling converter 407, and is magnified by a non-integer ratio to be a second output image 409. The second output image 409 can be an image with a size of 15*15 pixels under the 1.5× scaling factor (which is a non-integer).

In a practical application, the input image 401 (10*10 pixels) becomes the first output image 405 with a size of 10*10 pixels through the super-resolution machine-learning model 403. Then, the first output image 405 is magnified to be the second output image 409 with a size of 15*15 pixels, or is formed into the first output image 405 with a size of 20*20 pixels by a "2×" magnification ratio through the super-resolution machine-learning model 403. Afterwards, the second output image 409 with a size of 15*15 pixels is formed by a reduced magnification.

Nevertheless, since the image-scaling converter 407 does not have a good image magnification or reduction effect, the conventional non-integer ratio super-resolution algorithm may still have a problem of missing pixels in a second stage of the super-resolution algorithm.

SUMMARY OF THE DISCLOSURE

In order to implement a non-integer ratio super-resolution algorithm and to solve the problem that the conventional non-integer ratio super-resolution algorithm still requires a traditional image-scaling converter, the present disclosure provides a method for training a super-resolution model, a super-resolution method, a system, and a super-resolution algorithm that is applied to the super-resolution model. According to image information, the non-integer ratio artificial intelligence super-resolution algorithm is performed to obtain masks that are required by image-scaling conversion. This algorithm is also used to train the super-resolution machine-learning model, so as to obtain a large-sized and high-resolution image that has a better effect.

According to one embodiment of the method for training the non-integer ratio AI super-resolution model, an input image is provided, and a magnification ratio and an image quality threshold are set. After pixel values of the input image are retrieved, image features of the input image can be extracted. According to the image features and the magnification ratio, multiple channel images can be obtained through a super-resolution model. Afterwards, a mask with respect to each of the channel images can be obtained according to the magnification ratio and phase information corresponding to positions of output pixels. The multiple masks can be correspondingly applied to the channel images, so as to reshuffle an output image. The multiple masks that are used to obtain the output image can then be assessed according to the preset image quality threshold, so that an AI super-resolution model can be trained.

Preferably, in the model training process, by repeating the above-mentioned steps, an iterating process is incorporated to updating model parameters of the non-integer ratio AI super-resolution model so as to make the output image to be consistent with the image quality threshold.

Further, different ones of the input image are inputted repeatedly, and a huge amount of the input images and the iterating process are used, so as to obtain the model parameters of the AI super-resolution model through a convergent procedure.

Preferably, the model parameters implement the weights of the connections among multiple nodes in a convolution operation of a back propagation neural network.

The multiple channel images obtained by the super-resolution model are used to derive the output image through the corresponding masks. The process of deriving the output image is a process of obtaining the corresponding masks according to the phase information.

The AI super-resolution model obtained by the method embodies a super-resolution method that allows the input image to be magnified to be the output image with a non-integer ratio through the AI super-resolution model.

In the system of the AI super-resolution model, the main circuit components include a circuit for operating the super-resolution model, a memory, and an image-ratio convolution operation circuit. The circuit applies the AI super-resolution model to the input image. The memory is used to store the input image. The image-ratio convolution operation circuit determines the model parameters of the AI super-resolution mode according to the non-integer ratio and the positions of the output pixels. The system performs the non-integer ratio super-resolution method to magnify the input image to be the output image with the non-integer ratio through the AI super-resolution model.

Preferably, the system implements an application-specific integrated circuit applied to an audiovisual device.

Further, the system can perform the super-resolution method with a proper ratio by reducing a working frequency of the circuit for operating super-resolution model.

Still further, the memory can be a first-in-first-out (FIFO) static random access memory. The system is able to make the circuit for operating super-resolution model and the image-ratio convolution operation circuit to operate under a same working frequency and adopts the FIFO static random access memory to perform the super-resolution method.

The model parameters provided to the image-ratio convolution operation circuit can be the convolution weights selected from a weight bank for the convolution operation of the AI super-resolution model. The image-ratio convolution operation circuit can adopt a design of a single convolution layer or multiple convolution layers.

Further, the model parameters provided to the image-ratio convolution operation circuit can be multiple sets of the convolution weights obtained by a blending operation.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
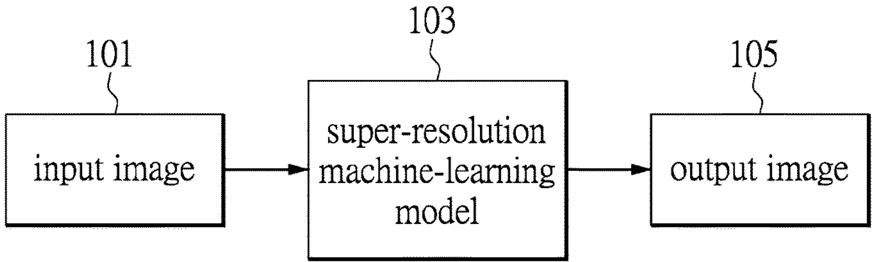
FIG. 1 is a schematic diagram illustrating operation of a conventional super-resolution algorithm.
Figure 2:
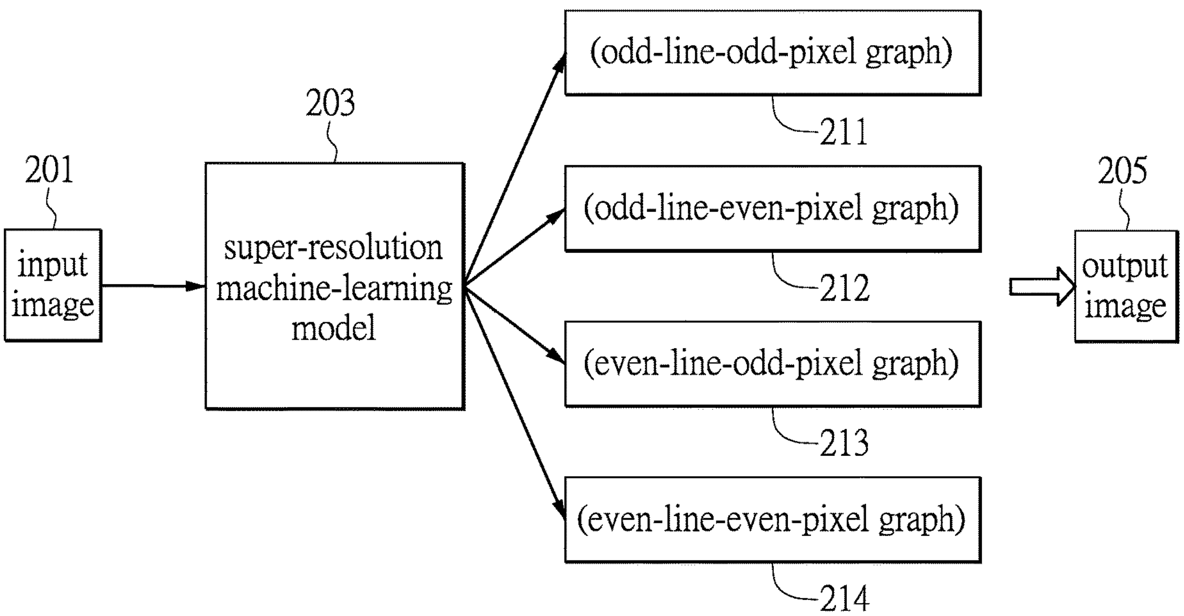
FIG. 2 is an exemplary diagram illustrating operation of a conventional integer magnification ratio super-resolution algorithm.
Figure 3:
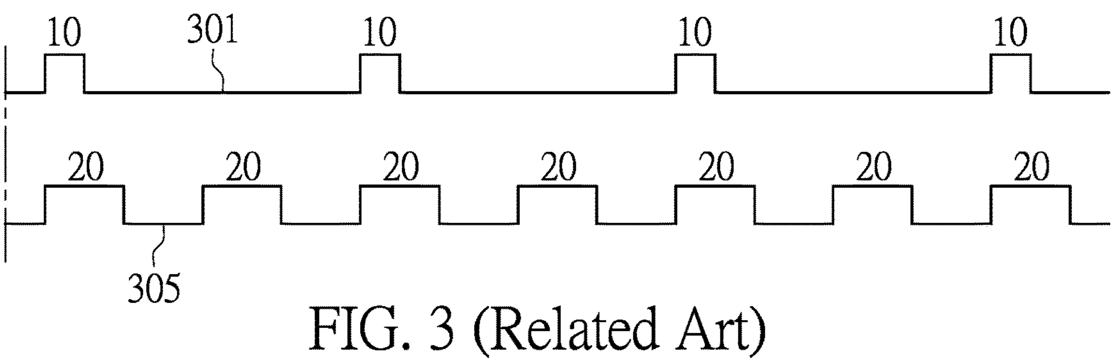
FIG. 3 is a timing diagram illustrating operation of the conventional super-resolution algorithm.
Figure 4:
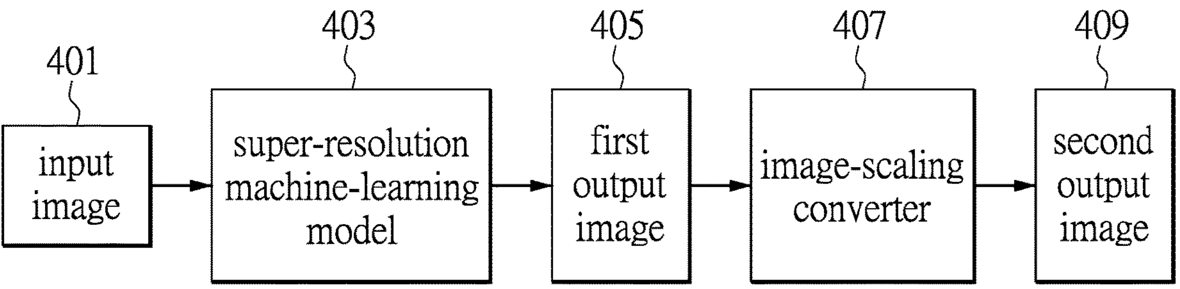
FIG. 4 is an exemplary diagram illustrating a conventional non-integer ratio super-resolution algorithm.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

The present disclosure provides a method for training a super-resolution model, a super-resolution method, and a system. The system relates to a super-resolution model that is trained through a neural network, a method for performing super resolution by this model, and relevant hardware. In this way, an input image can be magnified by a non-integer ratio through the super-resolution model.

The input image can be magnified by an integer ratio or the non-integer ratio that can be expressed by "N/M", in which "N" and "M" are natural numbers. The method relies on masks that can be obtained by an exemplary example shown in FIG. 5 to process a back propagation of a neural network, so as to train the non-integer ratio AI super-resolution model.

Figure 5:
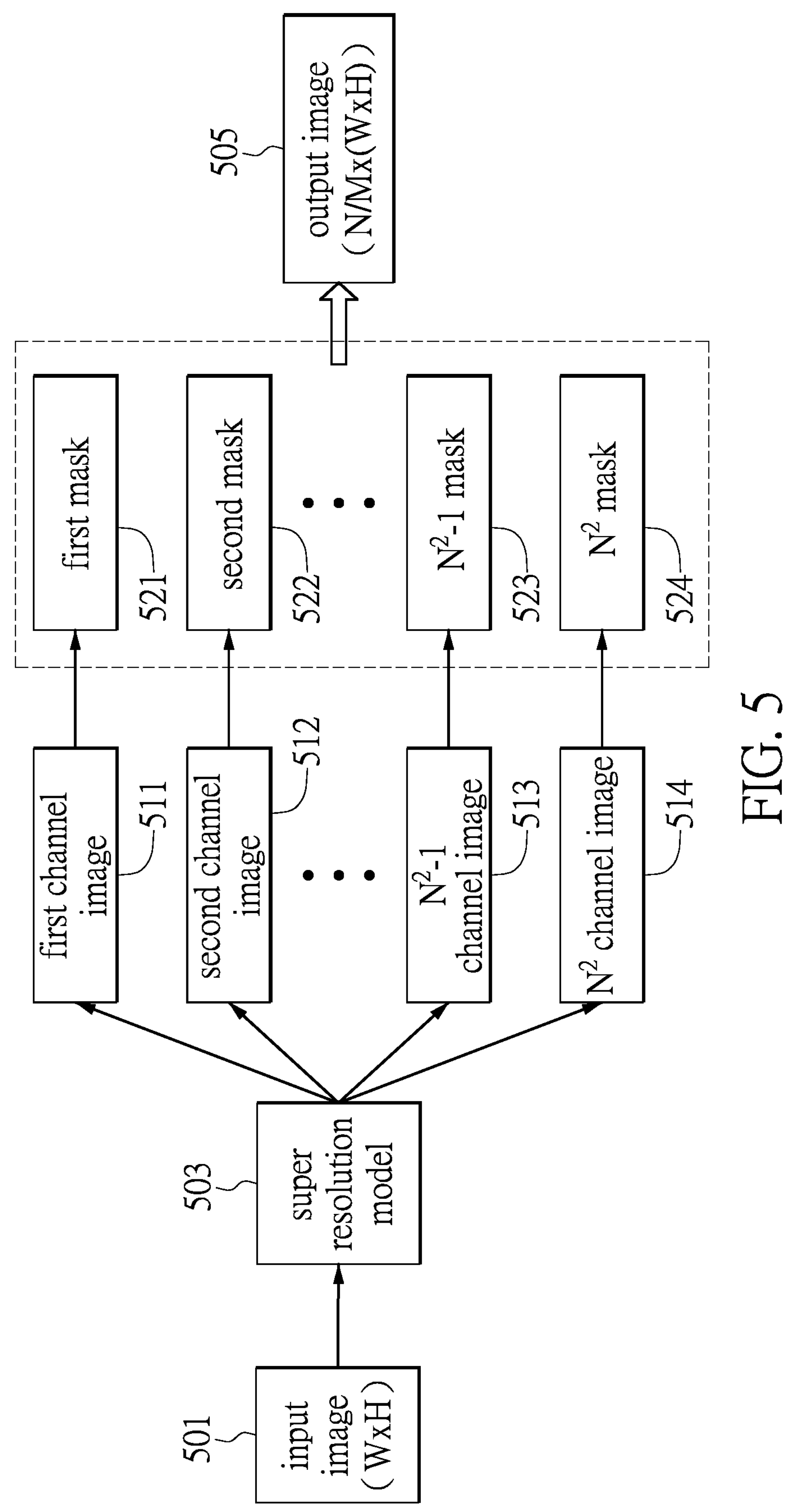
FIG. 5 is a schematic diagram illustrating operation of a method for performing a non-integer ratio artificial intelligence super-resolution algorithm according to one embodiment of the present disclosure.

According to a flowchart shown in FIG. 5, an input image 501 with an aspect ratio of W:H (in which "H" is a height and "W" a is width) is firstly provided to a super-resolution model 503 for performing an image-ratio convolution operation. The image-ratio convolution operation generates N 2 images with an aspect of W:H from the "W*H" input image 501 at a magnification ratio (N/M). The $N^2$ "W*H" images are, for example, $N^2$ channel images that include a first channel image 511, a second channel image 512, . . . , an ($N^2-1$)th channel image 513, and a ($N^2$)th channel image 514.

Since an output image 505 to be obtained at the magnification ratio (N/M) is decided before operation of a non-integer ratio AI super-resolution algorithm, the masks that have a one-by-one mapping to the $N^2$ channel images are required for shuffling the output image 505 with a size of "N/M*(W*H)" that is generated by the super-resolution model from the $N^2$ channel images at an "N/M" magnification ratio. In one embodiment of the present disclosure, the mask mapping to each of the channel images is generated according to the magnification ratio (N/M) and phase information that is obtained based on positions of output pixels. The masks shown in the diagram include, for example, a first mask 521, a second mask 522, . . . , an ($N^2-1$) mask 523, and an ($N^2$) mask 524.

The mask is designed pixel-by-pixel based on the input image 501. In an exemplary example, the pixels in each of the channel images one-by-one corresponding to the pixels of the output image 505 are marked as "1" and the rest pixels that do not correspond to any pixel of the output image in the channel image are marked as "0" so as to form the mask with respect to each of the channel images. Therefore, the channel images obtained by the super-resolution model can be used to derive the output image 505 through the masks. The process of deriving the output image 505 can be understood as a process for obtaining the multiple masks according to the phase information.

Figure 7:
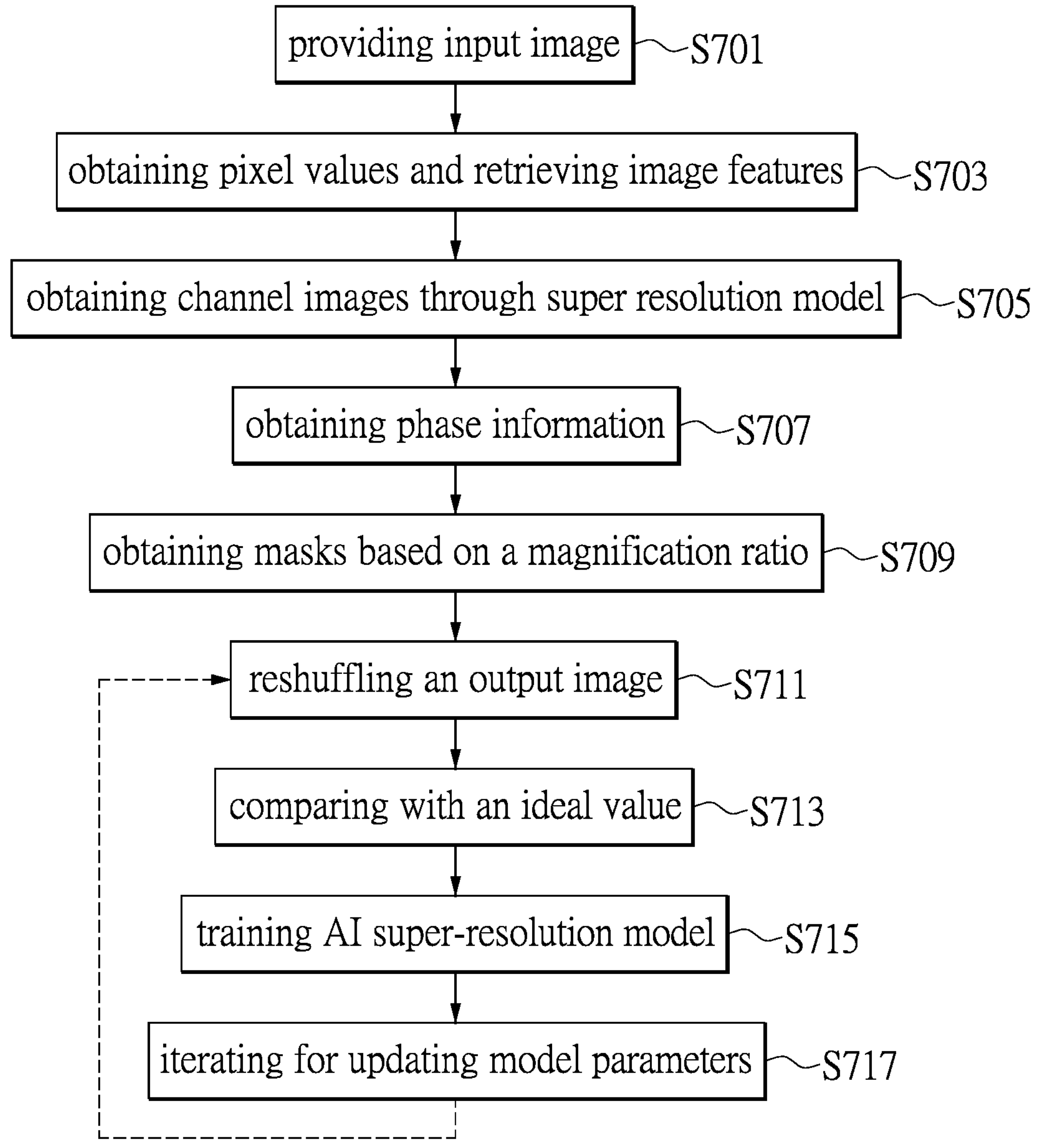
FIG. 7 is a flowchart illustrating a method for training a non-integer ratio AI super-resolution model according to one embodiment of the present disclosure.

Further, when establishing the non-integer ratio super-resolution model, the masks mapping to the channel images (511, 512, 513, 514) are firstly obtained according to the non-integer ratio and the phase information that is obtained based on the positions of the output pixels, so as to execute a neural network training. In this way, a new super-resolution model can be established, or the current super-resolution model can be established. According to one embodiment of the present disclosure, a back propagation neural network (BPNN) is introduced, and the above-mentioned masks are used to train the model parameters of the super-resolution model through the back propagation neural network (as shown in FIG. 7). The model parameters can be recognized as weights of connections among multiple nodes in the convolution operation of the back propagation neural network. For the non-integer ratio artificial intelligence super resolution operation, the model parameters serve as parameters used for performing an image-ratio convolution operation. After the training process, the super-resolution model is obtained. The super-resolution model can be used for converting the input image 501 to the output image 505 at a specific ratio. Further, by training the masks, the non-integer ratio super-resolution model can also be obtained.

Figure 6:
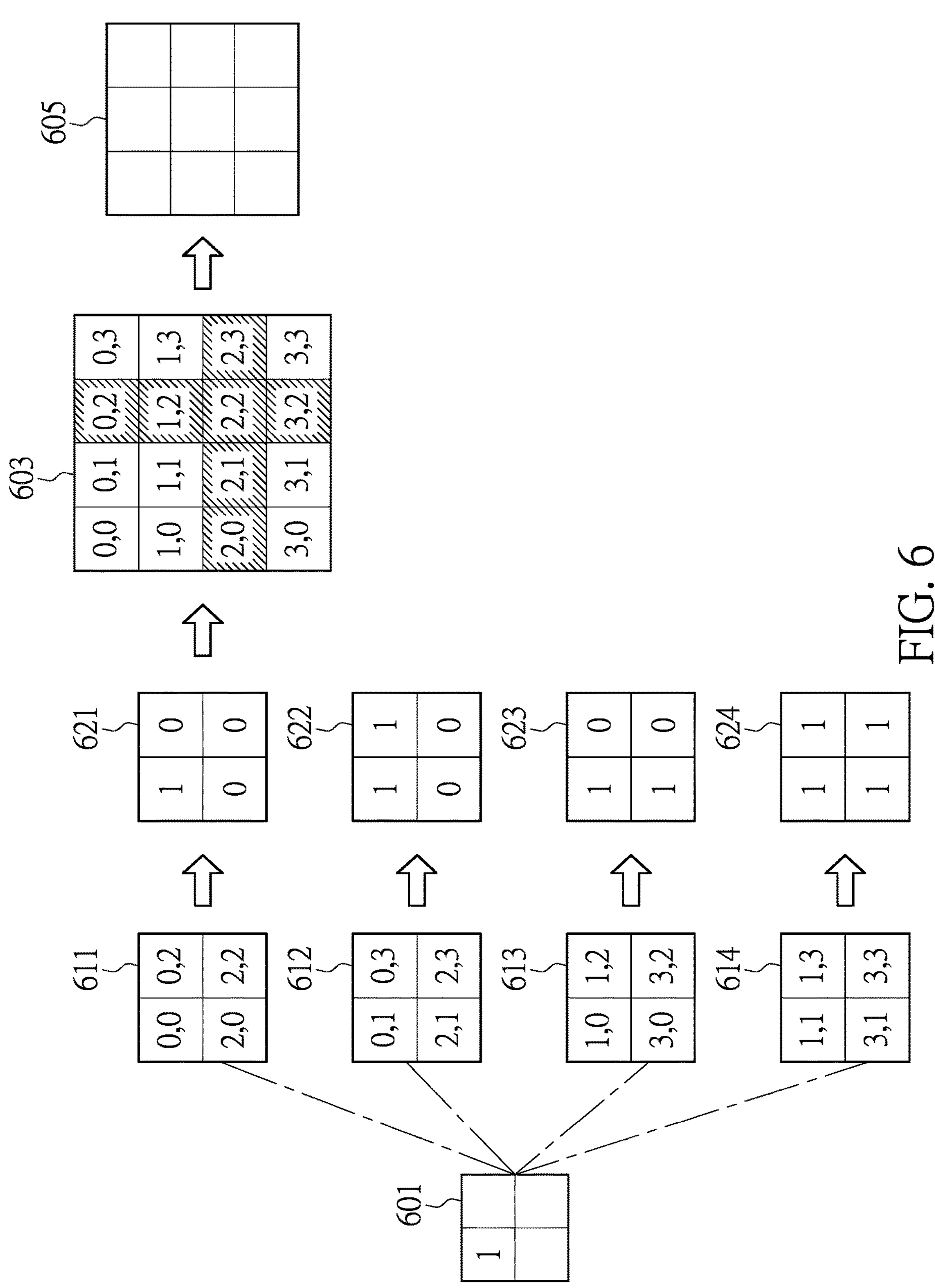
FIG. 6 is an exemplary diagram illustrating the method for performing the non-integer ratio artificial intelligence super-resolution algorithm.

FIG. 6 is an exemplary diagram illustrating operation of the non-integer ratio artificial intelligence super-resolution algorithm. An input image 601 with an initial aspect ratio of 2:2 (W:H) is shown in FIG. 6. Through the non-integer ratio artificial intelligence super-resolution algorithm, the input image 601 is converted to an output image 605 with an aspect ratio of 3:3 (W:H) through multiple channel images based on a "2×" scaling factor. The "2×2" input image 601 is magnified to be a target image at a non-integer ratio, which is the "3×3" output image 605. In the process, a first channel image 611, a second channel image 612, a third channel image 613 and a fourth channel image 614 are generated and used to render the corresponding masks based on the requirement for obtaining the "3×3" output image 605.

In the present example, the pixels of the first channel image 611 are labeled as (0,0), (0,2), (2,0) and (2,2) that map to a first mask 621 (1, 0, 0, 0), the pixels of the second channel image 612 are labeled as (0,1), (0,3), (2,1) and (2,3) that map to a second mask 622 (1, 1, 0, 0), the pixels of the third channel image 613 are labeled as (1,0), (1,2), (3,0) and (3,2) that map to a third mask 623 (1, 0, 1, 0), and the pixels of the fourth channel image 614 are labeled as (1,1), (1,3), (3,1) and (3,3) that map to a fourth mask 624 (1, 1, 1, 1). For purposes of reshuffling the output image 605, the phase information of each of the channel images is obtained through a comparison with image features of the output pixels. Accordingly, the multiple masks can be determined. The multiple channel images can be used to render a composite image 603 that includes pixels labeled as (0,0), (0,1), (0,2), (0,3), (1,0), (1,1), (1,2), (1,3), (2,0), (2,1), (2,2), (2,3), (3,0), (3,1), (3,2) and (3,3).

After the masks are applied to the composite image 603, the pixels (0,2), (1,2), (2,0), (2,1), (2,2), (2,3) and (3,2) of the composite image 603 are masked with a mask value "0", and the remaining pixels (i.e., (0,0), (0,1), (0,3), (1,0), (1,1), (1,3), (3,0), (3,1) and (3,3)) are masked with a mask value "1", so as to render the "3×3" output image 605. Through the above-described method for training the super-resolution model, the masks for various scales of the images can be obtained. The masks can be used to process the back propagation neural network, so as to train the model parameters of the AI super-resolution model.

FIG. 7 is a flowchart illustrating the method for training the super-resolution model in a non-integer ratio artificial intelligence super-resolution algorithm by use of the masks according to one embodiment of the present disclosure.

The super-resolution model operated in the method mentioned above is an AI model based on a neural network technology. In the step of training the super-resolution model with a huge amount of images, an input image is outputted at a time (step S701). An expected magnification ratio and an image quality threshold of an output image are set, so that the masks used in the present operation can also be determined.

When pixel values of the input image are retrieved, image features of the input image can also be extracted (step S703). According to the image features and the preset magnification ratio, multiple channel images used for the super-resolution algorithm are obtained through the super-resolution model (step S705). Afterwards, phase information can be obtained according to the magnification ratio and the positions of the output pixels (step S707). The mask that corresponds to each one of the channel images based on the preset magnification ratio can be obtained (step S709). Regarding production of the masks, reference can be made to the exemplary example shown in FIG. 5. The masks are then one-by-one mapped to the channel images, and the model parameters that can be iteratively updated are used in the super-resolution algorithm, so that an image is reshuffled according to the magnification ratio (step S711). Next, the image is compared with an ideal value that serves as a quality threshold of the output image (step S713), so that a difference is calculated. The difference serves as reference for assessing the masks and can be used to train an AI super-resolution model (step S715). After repeating the above steps in an iteration process, the model parameters of the AI super-resolution model are updated and applied to the step S711. The updated model parameters can be applied to the super-resolution algorithm, so that the output image is consistent with the image quality threshold.

Further, the above steps can be repeated when a different image is inputted. Through the huge amount of images and the iterating process, the model parameters of the AI super-resolution model can be obtained in a convergent procedure. The model parameters can be used to update the weights of the connections among an input layer, a hidden layer and an output layer of the neural network. Accordingly, an effective AI super-resolution model can be established.

One of the objectives of the above process is to establish the AI super-resolution model. The AI super-resolution model in the super-resolution method can directly render an output image that is magnified by a non-integer ratio. The AI super-resolution model and the relevant process can also be applied to a super-resolution system illustrated in FIG. 8.

Figure 8:
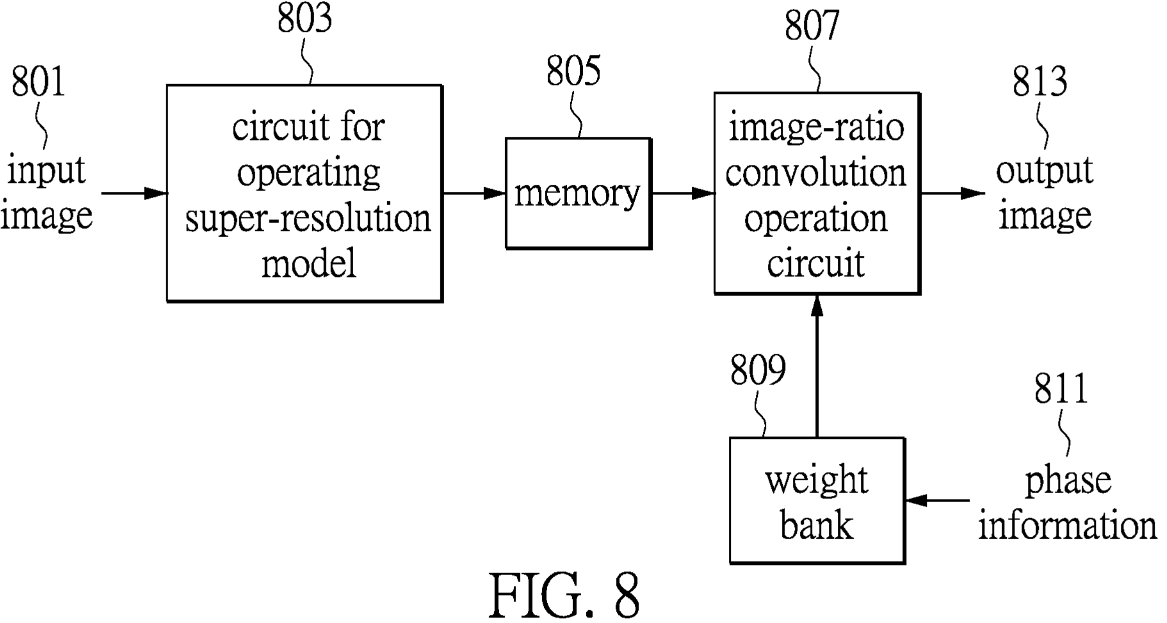
FIG. 8 is a functional block diagram illustrating a system that performs the non-integer ratio AI super-resolution model according to one embodiment of the present disclosure.

According to one embodiment of the present disclosure, the system implements a non-integer ratio artificial intelligence super-resolution algorithm through cooperation of hardware (e.g., circuits and intelligent algorithms). FIG. 8 is a functional block diagram illustrating the system according to one embodiment of the present disclosure. Every functional block shown in the diagram can be implemented by the circuits or through cooperation of hardware and software. Finally, an application-specific integrated circuit (ASIC) can be implemented and used in an audiovisual device (such as a television, a camera or a set-top box).

The system for implementing the artificial intelligence super-resolution algorithm can be divided in to three parts, which include a circuit for operating the super-resolution model (SR model) 803, a memory 805, and an image-ratio convolution operation circuit 807. The super-resolution model is the AI super-resolution model trained by the process as shown in FIG. 7. The system can operate under a working frequency that is the same as or different from a working frequency of the image-ratio convolution operation circuit 807. The AI super-resolution model is applied to an input image. The memory 805 can be a FIFO static random access memory, but other memory types are not excluded. The image-ratio convolution operation circuit 807 determines the model parameters of the AI super-resolution model according to the non-integer ratio and the image features of an input image 801, so that the purpose of magnifying the image at a specific non-integer ratio can be achieved. For example, phase information 811 can be obtained according to the non-integer ratio (N/M) and the positions of the output pixels, and convolution weights of the convolution operation can be selected from a weight bank 809 according to the phase information 811. The memory 805 is used to store feature values generated after operation of the circuit for operating the super-resolution model 803.

In particular, the above components can be implemented by logic circuits, and the circuit for operating the super-resolution model 803 and the image-ratio convolution operation circuit 807 can operate under the same or different (with a multiple relationship) clock frequencies, so that the system can operate in a flexible manner and effectively save power consumption. When the system performs the non-integer ratio super-resolution method, there are two types of operations. In one operation, when the working frequency of the circuit for operating the super-resolution model 803 is reduced to a proper ratio for effectively reducing the power consumption, the same performance of the super-resolution algorithm can still be achieved. In another operation, the system allows the circuit for operating the super-resolution model 803 and the image-ratio convolution operation circuit 807 to operate under the same working frequency. The FIFO static random access memory is adopted for processing the super-resolution algorithm with various ratios. The AI super-resolution model can be completely used, and there is no circuit delay during convolution multiplication, thereby improving the performance of the super-resolution algorithm.

According to one embodiment of the present disclosure, when the system is in operation, the input image 801 is line-by-line inputted into the memory 805, and the super-resolution model is applied to the input image 801 by the circuit 803 based on a non-integer ratio. In the meantime, the weight bank 809 is introduced. The convolution weights corresponding to each line of the pixels of the input image 801 are selected from the weight bank 809 according to the non-integer ratio and the phase information 811 obtained from the positions of the pixels of an output image. The convolution weights are applied to the connections among the layers of the neural network. Thus, it is unnecessary to input extra pixels of the input image 801 through the masks.

Taking a non-integer ratio "7/5" (N/M) as an example, "7*7" ($N^2$) sets of the convolution weights are required. Each of the pixels of the output image 813 has the corresponding phase information 811. The phase information 811 is referred to for selecting one set of the convolution weights from the "7*7" sets of the convolution weights in the weight bank 809. The selected set of the convolution weights is used for operation of the image-ratio convolution operation circuit 807, so as to render the final output image 813. The system is able to process the AI super-resolution algorithm for magnifying the image at the non-integer ratio.

Further, in one embodiment of the present disclosure, the image-ratio convolution operation circuit 807 can be designed to have a single convolution layer or multiple convolution layers. Therefore, the image-ratio convolution operation circuit 807 can retrieve multi-layer convolution weights from the weight bank 809, and can be used in other types of neural networks (e.g., a residual network).

Still further, the method for retrieving the convolution weights of the image-ratio convolution operation circuit 807 from the weight bank 809 according to the phase information 811 is not limited to the super-resolution method, but also allows other extended applications. In this way, the flexibility of the image-ratio convolution operation circuit 807 can be increased, or the image-ratio convolution operation circuit 807 can be used to adjust the image quality. Taking the non-integer ratio (N/M) as an example, while only one set of N*N convolution weights are required originally, the system can provide multiple sets (k sets) of "N*N" convolution weights. In the process of training the AI super-resolution model, a set of coefficients (c0, c1 to ck) corresponding to the k sets of convolution weights can be assigned for different applications. Finally, a blending operation (e.g., blending(+)) is used to obtain a set of convolution weights, which are further provided to the image-ratio convolution operation circuit 807.

In summation, in the method for training the super-resolution model, the super-resolution method, and the system provided by the present disclosure, the super-resolution model is incorporated with an AI learning technology to train a new AI super-resolution model based on masks that are obtained according to a non-integer magnification ratio and information of an output pixel. Accordingly, a non-integer ratio super-resolution algorithm can be implemented.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for training an artificial-intelligence (AI) super-resolution model, comprising:

providing an input image, and setting a magnification ratio and an image quality threshold;

retrieving pixel values of the input image, and extracting image features of the input image;

obtaining multiple channel images by using a super-resolution model to perform an image-ratio convolution operation on the input image according to the image features of the input image and the magnification ratio;

obtaining, according to the magnification ratio and phase information corresponding to positions of output pixels, masks, each of which corresponds to each one of the channel images;

correspondingly applying the masks to the channel images so as to reshuffle an output image; and assessing the masks that are used to obtain the output image according to the image quality threshold, so as to train the AI super-resolution model that allows the input image to be magnified to be the output image with a non-integer ratio.

2. The method according to claim 1, wherein, by repeating the steps of the method, model parameters of the AI super-resolution model are updated through incorporation of an iterating process, so that the output image is consistent with the image quality threshold.

3. The method according to claim 2, wherein the steps for training the AI super-resolution model further comprise: repeatedly inputting different ones of the input image, and using a huge amount of the input images and the iterating process, so as to obtain the model parameters of the AI super-resolution model in a convergent procedure.

4. The method according to claim 3, wherein the model parameters are weights of connections among multiple nodes in the image-ratio convolution operation of a back propagation neural network.

5. The method according to claim 2, wherein the channel images obtained by the super-resolution model are used to derive the output image through the corresponding masks, and the process of deriving the output image is a process of obtaining the corresponding masks according to the phase information.

6. The method according to claim 5, wherein pixels of each of the channel images that correspond to pixels of the output image in a one-by-one manner are marked as "1", and remaining ones of the pixels of the channel image that do not correspond to the pixels of the output image are marked as "0", so that the mask that corresponds to each one of the channel images is formed.

7. An artificial-intelligence super-resolution model, characterized in that the AI super-resolution model is obtained by performing the method as claimed in claim 1, and the AI super-resolution model allows the input image to be magnified to be the output image with a non-integer ratio.

8. A system of the artificial-intelligence (AI) super-resolution model obtained by performing the method as claimed in claim 1, the system comprising:

a circuit for operating the super-resolution model, wherein the circuit applies the AI super-resolution model to the input image;

a memory, wherein the memory is used to store feature values generated by the circuit for operating the super-resolution model; and an image-ratio convolution operation circuit, wherein the image-ratio convolution operation circuit determines model parameters of the AI super-resolution model according to a non-integer ratio and the positions of the output pixels;

wherein the system performs a non-integer ratio super-resolution method to magnify the input image to be the output image with the non-integer ratio through the AI super-resolution model.

9. The system according to claim 8, wherein the system implements an application-specific integrated circuit applied to an audiovisual device.

10. The system according to claim 9, wherein the system performs the non-integer ratio super-resolution method at a proper ratio by reducing a working frequency of the circuit for operating the super-resolution model.

11. The system according to claim 9, wherein the memory is a first-in-first-out (FIFO) static random access memory.

12. The system according to claim 11, wherein the system keeps the circuit for operating the super-resolution model and the image-ratio convolution operation circuit to operate under a same working frequency and adopts the FIFO static random access memory for performing the non-integer ratio super-resolution method.

13. The system according to claim 8, wherein the model parameters provided to the image-ratio convolution operation circuit are convolution weights selected from a weight bank for the image-ratio convolution operation of the AI super-resolution model.

14. The system according to claim 13, wherein the image-ratio convolution operation circuit adopts a design of a single convolution layer or multiple convolution layers.

15. The system according to claim 13, wherein the model parameters provided to the image-ratio convolution operation circuit are multiple sets of the convolution weights obtained by a blending operation.

* * * * *